United States Patent
Manolakos et al.

(10) Patent No.: US 12,526,106 B2
(45) Date of Patent: Jan. 13, 2026

(54) RELATION OF SHARED CHANNEL REFERENCE SIGNAL BUNDLING TO A PREEMPTION INDICATION

(71) Applicant: QUALCOMM Incorporated, San Diego, CA (US)

(72) Inventors: Alexandros Manolakos, Escondido, CA (US); Seyedkianoush Hosseini, San Diego, CA (US); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 17/904,912

(22) PCT Filed: Feb. 25, 2021

(86) PCT No.: PCT/US2021/019709
§ 371 (c)(1),
(2) Date: Aug. 24, 2022

(87) PCT Pub. No.: WO2021/173859
PCT Pub. Date: Sep. 2, 2021

(65) Prior Publication Data
US 2023/0078867 A1  Mar. 16, 2023

(30) Foreign Application Priority Data
Feb. 27, 2020 (GR) .............................. 20200100107

(51) Int. Cl.
*H04L 5/00* (2006.01)
(52) U.S. Cl.
CPC .......... *H04L 5/0051* (2013.01); *H04L 5/0091* (2013.01)

(58) Field of Classification Search
CPC ........................... H04L 5/0051; H04L 5/0091
See application file for complete search history.

(56) References Cited

U.S. PATENT DOCUMENTS

2019/0104532 A1*  4/2019  Park ...................... H04L 5/0082
2019/0159181 A1   5/2019  Manolakos et al.
(Continued)

FOREIGN PATENT DOCUMENTS

| AU | 2018315101 A1 * | 3/2020 | ........... H04L 5/0005 |
| AU | 2019220699 A1 * | 8/2020 | ........... H04L 1/0013 |

(Continued)

OTHER PUBLICATIONS

International Search Report and Written Opinion—PCT/US2021/019709—ISA/EPO—May 28, 2021.
Taiwan Search Report—TW110107036—TIPO—Nov. 25, 2024.

*Primary Examiner* — Michael J Moore, Jr.
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a preemption indication indicating that resources of at least one shared channel communication among one or more shared channel communications of a shared channel are to be preempted, where the one or more shared channel communications are to be time-domain reference signal (RS) bundled based at least in part on an RS associated with the shared channel. The UE may selectively perform time-domain RS bundling of the one or more shared channel communications based at least in part on the preemption indication. Numerous other aspects are provided.

30 Claims, 11 Drawing Sheets

(56) References Cited

U.S. PATENT DOCUMENTS

| | | | |
|---|---|---|---|
| 2019/0254020 A1* | 8/2019 | Nam | H04L 5/0051 |
| 2019/0306700 A1* | 10/2019 | Lin | H04W 72/0446 |
| 2020/0015202 A1 | 1/2020 | Khoshnevisan et al. | |
| 2020/0045707 A1 | 2/2020 | Hwang et al. | |
| 2022/0393824 A1* | 12/2022 | Yang | H04L 5/0051 |
| 2023/0078867 A1* | 3/2023 | Manolakos | H04L 5/0091 |
| | | | 370/336 |
| 2023/0101476 A1* | 3/2023 | Ryu | H04L 5/0051 |
| | | | 370/329 |

FOREIGN PATENT DOCUMENTS

| | | | | |
|---|---|---|---|---|
| WO | 2018231971 A1 | 12/2018 | | |
| WO | WO-2019139955 A1 * | 7/2019 | | H04W 72/23 |
| WO | WO-2019160718 A1 * | 8/2019 | | H04L 5/0048 |
| WO | WO-2020010191 A1 * | 1/2020 | | H04L 1/0036 |
| WO | 2020033253 | 2/2020 | | |

* cited by examiner

RELATION OF SHARED CHANNEL REFERENCE SIGNAL BUNDLING TO A PREEMPTION INDICATION

CROSS-REFERENCE TO RELATED APPLICATIONS

This Patent Application is a 371 national stage of PCT application No. PCT/US2021/019709, filed on Feb. 25, 2021, entitled "RELATION OF SHARED CHANNEL REFERENCE SIGNAL BUNDLING TO A PREEMPTION INDICATION," which claims priority to Greece Patent Application Serial No. 20200100107, filed on Feb. 27, 2020, entitled "RELATION OF PHYSICAL DOWNLINK SHARED CHANNEL DEMODULATION REFERENCE SIGNAL BUNDLING TO A DOWNLINK PREEMPTION INDICATION," and assigned to the assignee hereof. The disclosure of the prior Applications are considered as part of and are incorporated by reference into this Patent Application.

FIELD OF THE DISCLOSURE

Aspects of the present disclosure generally relate to wireless communication and to techniques and apparatuses for relation of shared channel reference signal (RS) bundling to a preemption indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a UE, may include receiving a preemption indication indicating that resources of at least one shared channel communication among one or more shared channel communications of a shared channel are to be preempted, wherein the one or more shared channel communications are to be time-domain reference signal (RS) bundled based at least in part on an RS associated with the shared channel; and selectively performing time-domain RS bundling of the one or more shared channel communications based at least in part on the preemption indication.

In some aspects, a UE for wireless communication may include a memory and one or more processors operatively coupled to the memory. The memory and the one or more processors may be configured to receive a preemption indication indicating that resources of at least one shared channel communication among one or more shared channel communications of a shared channel are to be preempted, wherein the one or more shared channel communications are to be time-domain RS bundled based at least in part on an RS associated with the shared channel; and selectively perform time-domain RS bundling of the one or more shared channel communications based at least in part on the preemption indication.

In some aspects, a non-transitory computer-readable medium may store one or more instructions for wireless communication. The one or more instructions, when executed by one or more processors of a UE, may cause the one or more processors to receive a preemption indication indicating that resources of at least one shared channel communication among one or more shared channel communications of a shared channel are to be preempted, wherein the one or more shared channel communications are to be time-domain RS bundled based at least in part on an RS associated with the shared channel; and selectively perform time-domain RS bundling of the one or more shared channel communications based at least in part on the preemption indication.

In some aspects, an apparatus for wireless communication may include means for receiving a preemption indication indicating that resources of at least one shared channel communication among one or more shared channel communications of a shared channel are to be preempted, wherein the one or more shared channel communications are to be time-domain RS bundled based at least in part on an RS associated with the shared channel; and means for selectively performing time-domain RS bundling of the one or more shared channel communications based at least in part on the preemption indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
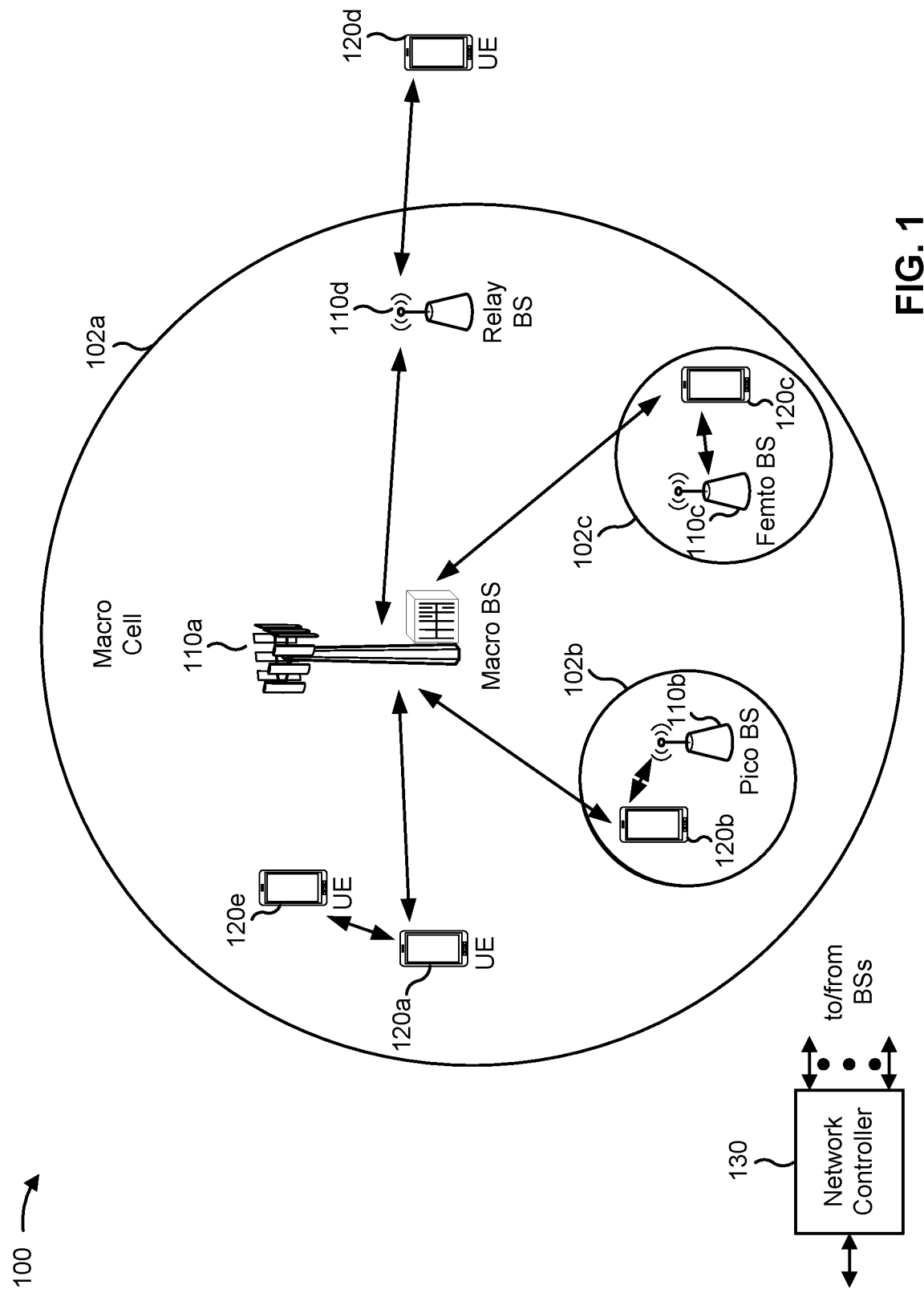
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered as machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered as Internet-of-Things (IoT) devices, and/or may be implemented as NB-IoT (narrowband internet of things) devices. Some UEs may be considered as a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
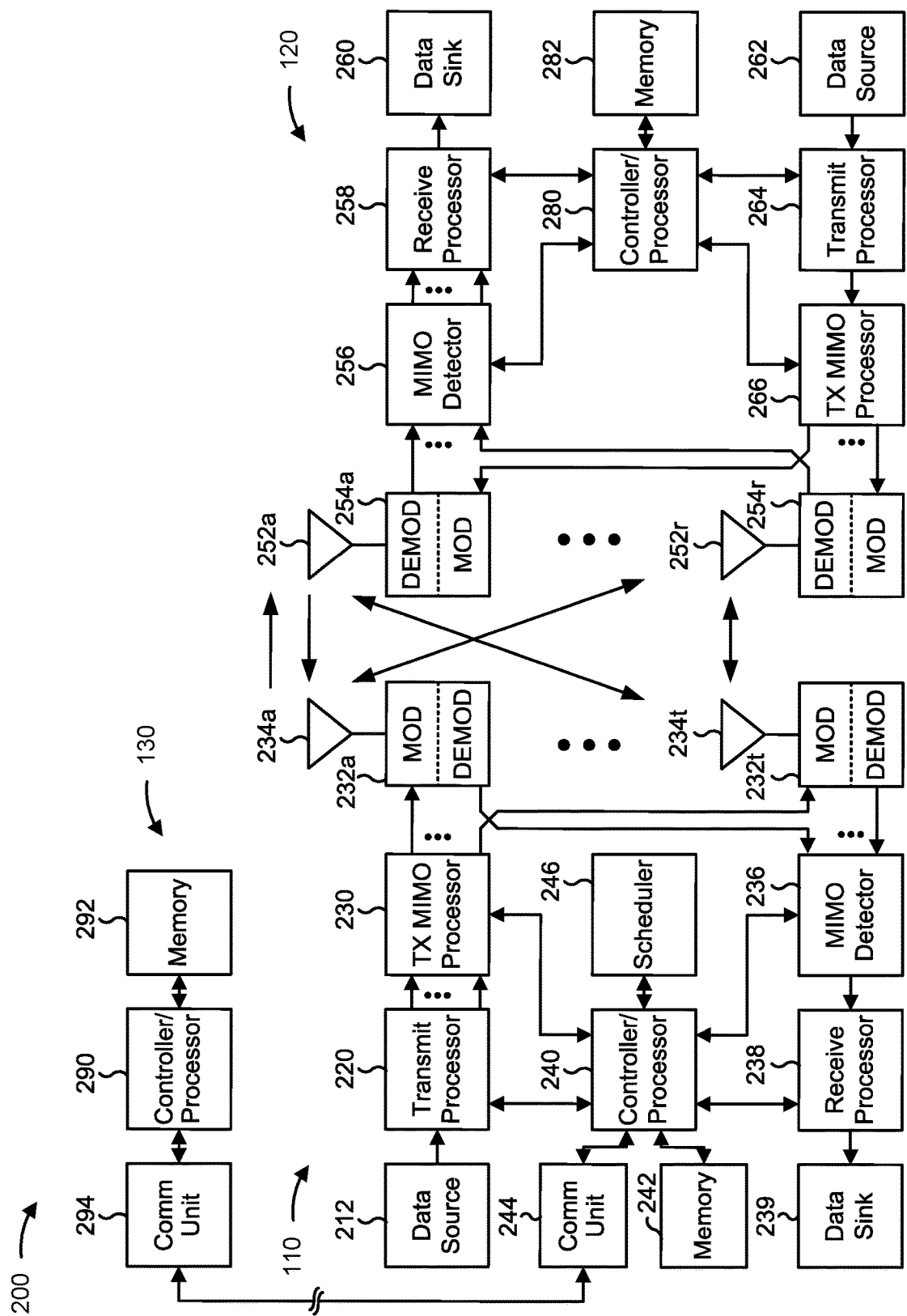
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with relation of shared channel reference signal bundling to a preemption indication, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., processor 258 and/or controller/processor 280) of the UE 120, cause the one or more processors to perform the method described in greater detail with reference to FIGS. 5A-5F and 6.

In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 6 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving (e.g., antenna 252, DEMOD 254, MIMO detector 256, receive processor 258, controller/processor 280, memory 282, and/or the like) a preemption indication indicating that resources of at least one shared channel communication among one or more shared channel communications of a shared channel (e.g., one or more PDSCH communications of a PDSCH) are to be preempted, wherein the one or more shared channel communications are to be time-domain RS bundled (e.g., time-domain DMRS bundled) based at least in part on an RS associated with the shared channel (e.g., a DMRS associated with the PDSCH); means for selectively performing (e.g., DEMOD 254, MIMO detector 256, receive processor 258, controller/processor 280, memory 282, and/or the like) time-domain RS bundling of the one or more shared channel communications based at least in part on the preemption indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
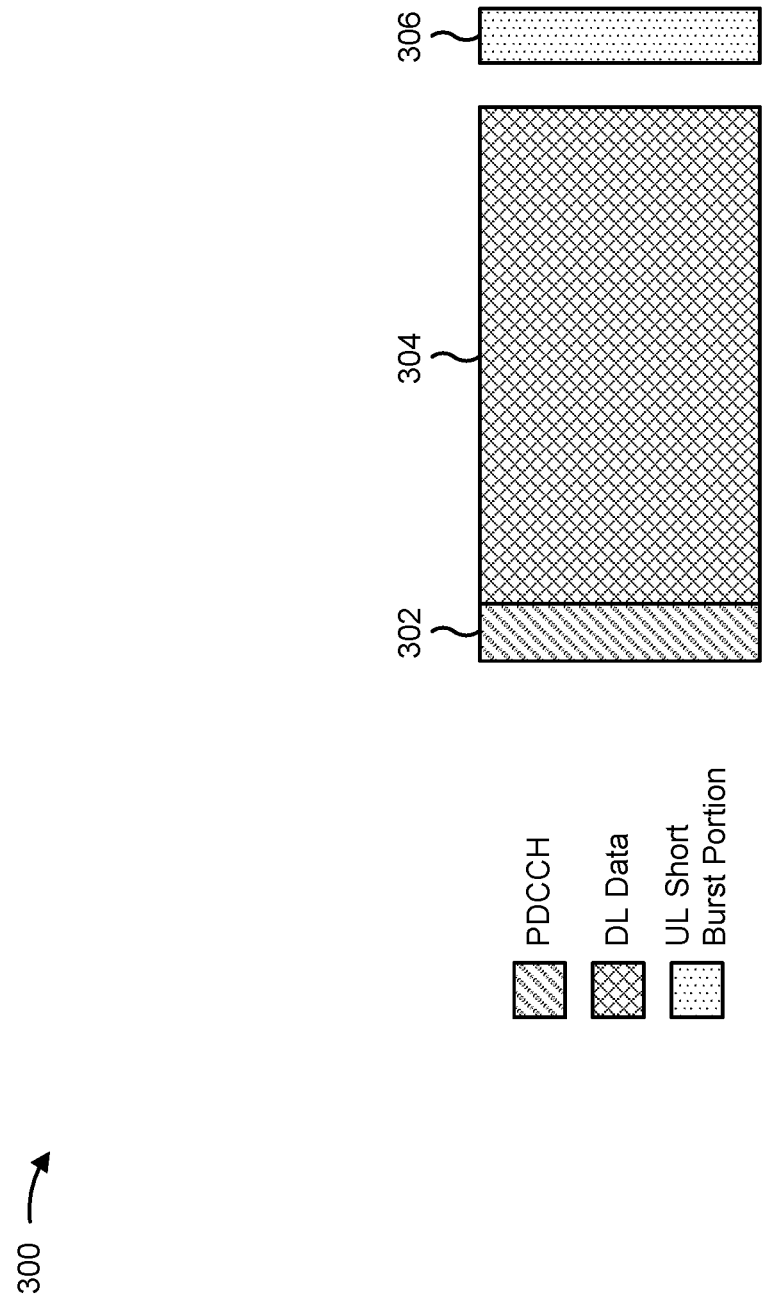
FIG. 3 is a diagram illustrating an example of a downlink (DL)-centric slot, in accordance with various aspects of the present disclosure.

FIG. 3 is a diagram 300 showing an example of a DL-centric slot or wireless communication structure that may be used in aspects of the present disclosure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity or scheduled (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
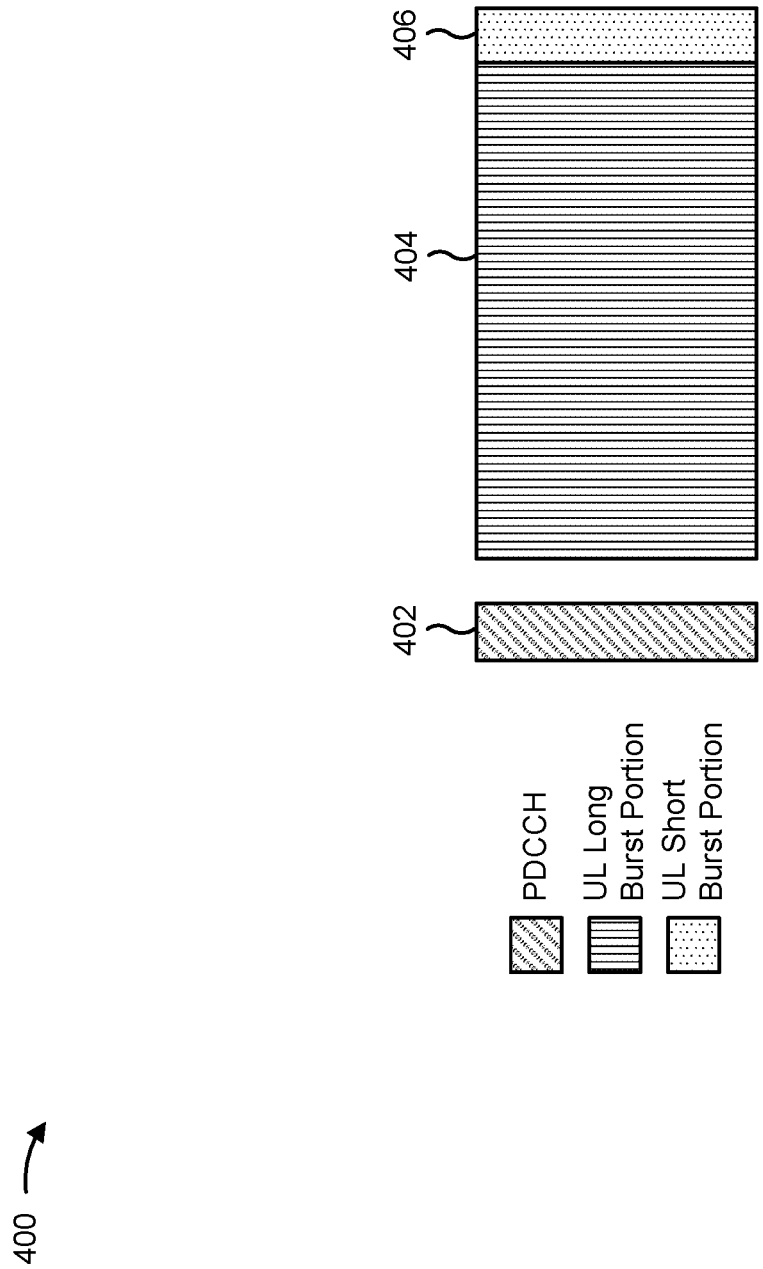
FIG. 4 is a diagram illustrating an example of an uplink (UL)-centric slot, in accordance with various aspects of the present disclosure.

FIG. 4 is a diagram 400 showing an example of an UL-centric slot or wireless communication structure that may be used in aspects of the present disclosure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL long burst portion 404 may refer to the communication resources utilized to communicate UL data from the subordinate or scheduled entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In an NR system, reference signal (RS) bundling in the time domain (which may also be referred to as time-domain reference signal bundling) enables reference signals across multiple slots to be used/bundled in association with receiving a data channel carried in a given one of the multiple slots, in other words, enables the multiple slots to be time-domain reference signal bundled. As a particular example, performing time-domain DMRS bundling for a group of PDSCH communications allows DMRSs across the group of PDSCH communications to be bundled in association with receiving a given one of the PDSCH communications. Reference signal bundling in the time domain can, for example, provide coverage enhancement, enable high mobility, and provide low DMRS overhead with peak throughput.

So-called "look-ahead" DMRS bundling allows a UE to be signaled a set of upcoming slots for which the UE may assume that data channels are bundled. For example, downlink control information (DCI) in a first slot may carry an indication that a next two upcoming slots are to be time-domain DMRS bundled. Conversely, so-called "look-back" DMRS bundling allows a UE to be signaled a set of previous slots (e.g., a set of slots already received at the UE) for which the UE may assume that the data channels are bundled. For example, a toggling bit in DCI may carry a new bundling indicator (NBI). Here, in a first slot, the NBI may have a first value (e.g., 0). Similarly, in a second slot, the NBI may also have the first value, meaning that the second slot is to be bundled with the previous (first) slot. However, in a third slot, the NBI may have a second value (e.g., 1). Here, the NBI having a different value indicates that the third slot is not to be bundled with the previous (first and second) slots. In this example, upon receiving the third slot, the UE may perform time-domain DMRS bundling for the first and second (i.e., previously received) slots. The NBI may be similarly used in subsequent slots to further indicate different bundles. In some cases of look-back bundling, a UE may be configured to bundle DMRS across PDSCH communications with continuous (e.g., increasing without gap) downlink counter downlink assignment indices (DAI), in addition to conditioning bundling on the NBI in the manner described above.

There are a number of UE complexity considerations related to DCI-based DMRS bundling. For example, in some cases, the UE may be expected to perform time-domain bundling only if the same port identifiers are used in a previous PDSCH and a new PDSCH for which time-domain DMRS bundling is to be performed. If different port identifiers are used, this may serve as an indication that bundling is not needed (e.g., since the PDSCHs would be different channels). As another example, the UE may be expected to perform time-domain bundling only if a previous PDSCH and a new PDSCH are of the same type (e.g., Type A, Type B, or the like). Here, different types of PDSCH may have different DMRS patterns, which would increase complexity at the UE when performing bundling. As another example, the UE may be expected to perform time-domain bundling only if a previous PDSCH and a new PDSCH have the same DMRS pattern with respect to the actual location of DMRS symbols within the PDSCH (e.g., to keep complexity at the UE relatively low). As another example, the UE may be expected to perform time-domain bundling only if the same DMRS type (e.g., Type 1, Type 2, or the like) is used between a previous and a new PDSCH. In general, if the applicable assumptions are not met, then the UE may not be expected to time-domain bundle DMRS across PDSCH communications.

Further, in an NR system, preemption enables a first type of communication to be punctured or interrupted to allow a (e.g., higher priority) second type of communication to be communicated. For example, preemption allows an enhanced mobile broadband (eMBB) communication to be punctured or interrupted to allow an ultra-reliable low-latency communication (URLLC) communication to be communicated. However, such preemption may cause a loss of phase coherence between the transmit durations associated with the first communication because the transmit durations have been made non-contiguous by the second communication. For example, on the uplink, a URLLC communication may have a different transmit power than an eMBB communication, which may cause loss of phase coherence. As another example, a URLLC communication may be scheduled in a different component carrier or bandwidth part such that the UE has to tune-away a radio frequency (RF) to communicate (e.g., receive or transmit) the URLLC communication and then tune back for the eMBB communication, which can cause loss of phase coherence.

An indication-based multiplexing approach to preemption may be beneficial for both URLLC and eMBB UEs at a cost of indicator overhead. In some cases, an indication of a preemption (herein referred to as a preemption indication) may be a current indication with respect to the preempting communication. For example, for a URLLC communication that is preempting an eMBB communication, the preemption indication (PI) may be provided in DCI that is current with (i.e., at the same time as) the URLLC communication. Alternatively, in some cases, the preemption indication may be a post-indication with respect to the preempting communication and the preempted communication. For example, for a URLLC communication that is preempting an eMBB communication, the preemption indication may be provided in DCI after (e.g., in a next slot) both the URLLC communication and the eMBB communication. Alternatively, in some cases, the preemption indication may be a post-indication with respect to the preempting communication and current with the preempted communication. For example, for a URLLC communication that is preempting an eMBB communication, the preemption indication may be provided after the URLLC communication, but within the same slot of the eMBB communication (e.g., in one or more symbols of the eMBB slot).

In some cases, when implementing preemption, a particular DCI format (e.g., DCI format 2_1) is used for notifying the UE of resources (e.g., one or more physical resource blocks and/or one or more symbols) where the UE may assume no transmission is intended for the UE. As an example of preemption, a base station may schedule a first UE to receive an eMBB communication during a slot. In the middle of the slot, a URLLC packet for a second UE may arrive at the base station, and the base station may schedule and transmit the packet to the second UE in a subset of resources of the slot. Here, the base station would indicate, to the first UE via a downlink preemption indication (e.g., in the next slot), the subset of resources of the slot that are punctured (i.e., used for the transmission of the URLLC packet to the second UE). The first UE can use this information to enhance decoding of the eMBB communication. In some cases, DCI format 2_1 can be used to transmit a set of preemption indications (e.g., preemption indication 1 through preemption indication N), where each preemption indication is 14 bits. For each UE, a different preemption indication can correspond to a different set of component carriers (e.g., serving cells).

In a wireless communication system that allows both time-domain DMRS bundling and preemption, such as an NR system, a UE may be signaled that a group of PDSCH communications are to be time-domain DMRS bundled, and may also receive a downlink preemption indication indicating that resources of at least one PDSCH communication of the one or more of the time-domain DMRS-bundled PDSCH communications are to be preempted (e.g., fully or partially). In other words, the UE may receive a downlink preemption indication that could conflict with a performance of time-domain DMRS bundling. Therefore, the UE should be configured to handle the time-domain DMRS bundling in light of the preemption indication. Notably, such an issue is not present in a wireless communication system in which downlink preemption was not allowed, such as an LTE system.

Some aspects described herein provide techniques and apparatuses for handling of time-domain RS bundling of a group of shared channel communications in light of a preemption indication indicating that resources of at least one shared channel communication among the group of shared channel communications are to be at least partially preempted. In some aspects, the UE may receive a preemption indication indicating that resources of at least one shared channel communication among one or more shared channel communications that are to be time-domain RS bundled are to be preempted, and may selectively perform time-domain RS bundling of the one or more shared channel communications based at least in part on the preemption indication. Additional details are provided below.

FIGS. 5A-5F are diagrams illustrating examples associated with relation of shared channel reference signal bundling to a preemption indication, in accordance with various aspects of the present disclosure. Notably, the techniques and apparatuses described in association with FIGS. 5A-5F are described in the context of relation of PDSCH DMRS bundling to a downlink preemption indication. However, these techniques can be applied to other types of shared channels (e.g., uplink shared channels, sidelink shared channels, or the like) and/or other types of reference signals (e.g., a reference signal used on for an uplink shared channel, a reference signal used for a sidelink shared channel, or the like).

Figure 5A:
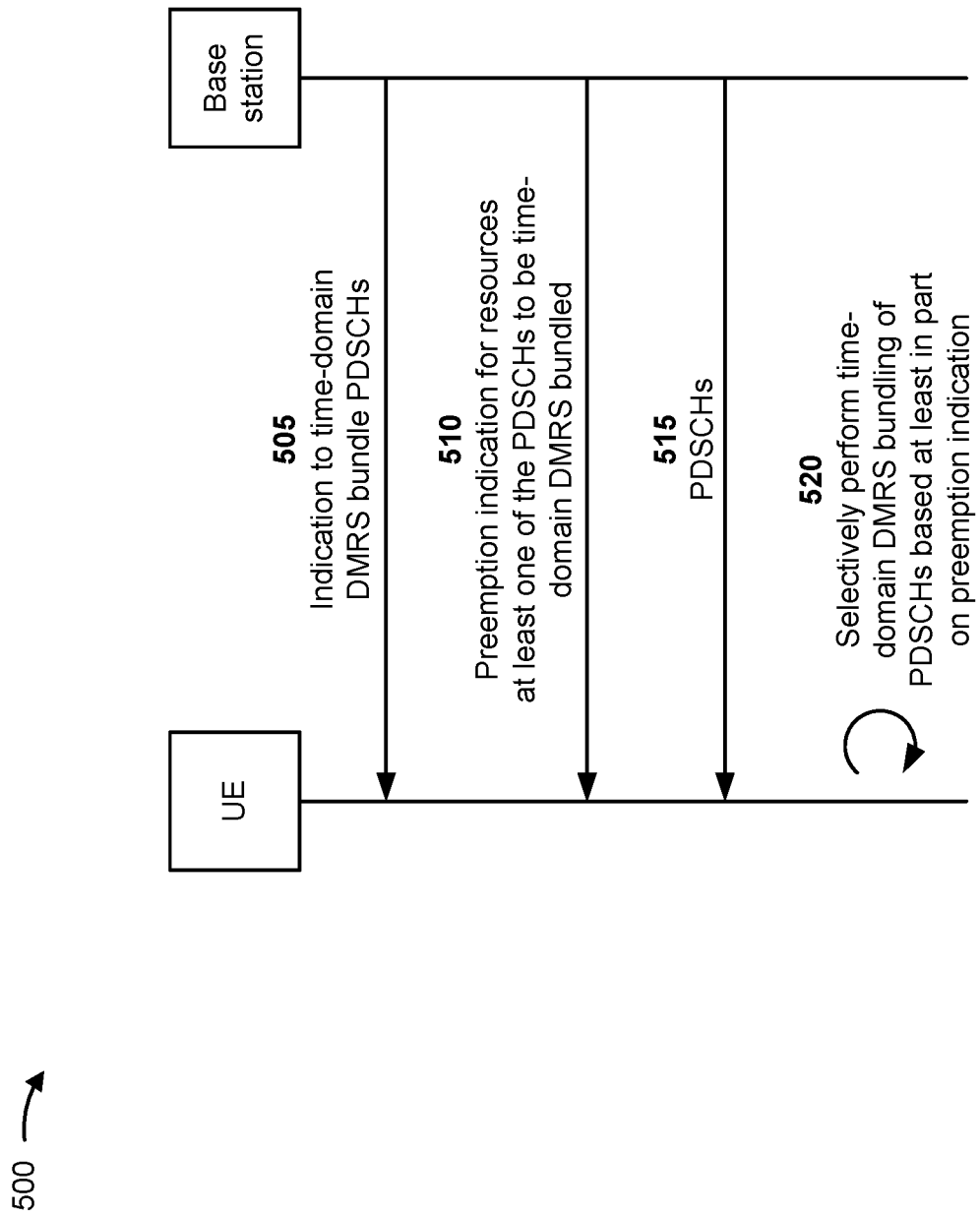
FIGS. 5A-5F are diagrams illustrating examples associated with relation of physical downlink shared channel (PDSCH) demodulation reference signal (DMRS) bundling to a downlink preemption indication, in accordance with various aspects of the present disclosure.

As shown by reference 505 in FIG. 5A, a base station (e.g., a base station 110) may provide, to a UE (e.g., a UE 120), an indication that one or more PDSCH communications are to be time-domain DMRS bundled. In some aspects, the indication may be provided to the UE via radio resource control (RRC) signaling, a medium access control control element (MAC-CE), DCI, or the like.

As shown by reference 510, the base station may also provide, to the UE, a preemption indication indicating that resources of at least one PDSCH among the one or more PDSCH communications are to be preempted. For example, the base station may provide, and the UE may receive, a preemption indication that identifies a set of preempted resources. The UE may determine, based at least in part on the information that identifies the set of preempted resources and the indication that the one or more PDSCH communications are to be time-domain DMRS bundled, that the preemption indication indicates that resources of the at least one PDSCH communication among the one or more DMRS bundled PDSCH communications are to be preempted. As shown by reference 515, the base station may transmit the one or more PDSCH communications that are to be time-domain DMRS bundled.

As shown by reference 520, the UE may selectively perform time-domain DMRS bundling of the one or more PDSCH communications based at least in part on the preemption indication. In some aspects, selectively performing time-domain DMRS bundling may include performing time-domain DMRS bundling for all of the PDSCH communications, performing time-domain DMRS bundling for one or more subsets of the one or more PDSCH communications, or refraining from performing time-domain DMRS bundling for the one or more PDSCH communications, as described in further detail below. In some aspects, the UE may adjust time-domain DMRS bundling for the one or more PDSCH communications indicated by the base station in indication 505 based at least in part on the preemption indication 510. The adjustment may include omitting one or more of the indicated PDSCH communications from the time-domain DMRS bundling as described in more detail below.

In some aspects, the UE may selectively perform the time-domain DMRS bundling based at least in part on a type of preemption associated with the preemption indication. The type of preemption may be indicative of, for example, whether one or more DMRS resources are indicated as preempted. That is, the type of preemption may depend on whether the preemption indication indicates preemption of data symbols only (i.e., no preemption of DMRS resources). In some aspects, the UE may determine whether the resources indicated by the preemption indication include one or more DMRS resources in association with determining the type of preemption. Here, if the UE determines that the preemption indication indicates preemption of only data symbols, then the UE may, in some aspects, perform time-domain DMRS bundling across all of the PDSCH communications (e.g., including any preempted PDSCH communications, since all DMRSs are still intact). Conversely, if the UE determines that the preemption indication indicates preemption of one or more DMRS resources, then the UE may, in some aspects, perform time-domain DMRS bundling in a manner that accounts for the preemption of the one or more DMRS resources, examples of which are described in further detail below. In some aspects, the behavior of the UE when performing time-domain DMRS bundling in the case of preemption of one or more DMRS resources may be based at least in part on a UE capability.

As another example, the type of preemption may be indicative of whether a PDSCH is to be fully preempted. That is, the type of preemption may depend on whether the preemption indication indicates full preemption of a PDSCH communication (i.e., such that the PDSCH includes empty symbols). In some aspects, the UE may determine whether the resources indicated by the preemption indication indicate that the PDSCH communication is to be fully preempted in association with determining the type of preemption. Here, if the UE determines that the preemption indication indicates full preemption of a PDSCH communication, then the UE may, in some aspects, determine whether a gap, associated with the PDSCH communication that is to be fully preempted, satisfies a threshold. Here, if the gap does not satisfy (e.g., is smaller than or equal to) the threshold, then the UE may perform time-domain DMRS bundling in a manner that disregards the gap. Conversely, if the gap satisfies (e.g., is larger than) the threshold, then the UE may perform time-domain DMRS bundling in a manner that accounts for the gap (e.g., since the gap may result in a loss of phase coherency), examples of which are described in further detail below. In some aspects, the behavior of the UE when performing time-domain DMRS bundling in the case of a full PDSCH preemption may be based at least in part on a UE capability.

In some aspects, the UE may selectively perform the time-domain DMRS bundling based at least in part on timing of the preemption indication. For example, the UE may selectively perform time-domain DMRS bundling based at least in part on a determination that the preemption indication is a post-indication associated with the preemption. In some aspects, the UE may determine that the preemption indication is a post-indication based at least in part on the preemption indication being received after an end of a last PDSCH communication of the one or more PDSCH communications indicated to be time-domain DMRS bundled. In some aspects, the UE may determine that the preemption indication is a post-indication based at least in part on the preemption indication being received at least a threshold amount of time after an end of a last PDSCH communication of the one or more PDSCH communications indicated to be time-domain DMRS bundled. In some aspects, the threshold amount of time may be based at least in part on a UE capability. In some aspects, the UE may determine that the preemption indication is a post-indication based at least in part on the preemption indication being received at a time that would cause the UE to change a DMRS bundling behavior (e.g., a time at which the UE is unable to update DMRS-bundled channel estimation processing that has already started). In some aspects, in the case of a post-indication, the UE may not change the time-domain DMRS bundling behavior. In some aspects, the determination that the preemption indication is a post-indication may be based at least in part on a UE capability. For example, a UE capability of a first UE may cause the first UE to determine whether a preemption indication is a post-indication based at least in part on whether the preemption indication is received after an end of a last PDSCH communication of the one or more PDSCH communications indicated to be time-domain DMRS bundled. As another example, a UE capability of a second UE may cause the second UE to determine whether a preemption indication is a post-indication based at least in part on whether the preemption indication is received at a time that would cause the second UE to change a DMRS bundling behavior.

As another example, the UE may selectively perform the time-domain DMRS bundling based at least in part on a determination that the preemption indication is a pre-indication associated with the preemption, e.g. before the one or more preempted PDSCH communications. Similarly, as another example, the UE may selectively perform the time-domain DMRS bundling based at least in part on a determination that the preemption indication is a current-indication associated with the preemption. In some aspects, in the case of a pre-indication or a current-indication, the UE may be expected to continue the time-domain DMRS bundling (e.g., if DMRS of the preempted PDSCH communication is not affected).

In some aspects, the UE may selectively perform the time-domain DMRS bundling based at least in part on a UE capability (e.g., a capability of the UE that dictates or controls performing time-domain DMRS bundling).

In some aspects, the UE may selectively perform the time-domain DMRS bundling based at least in part on a configured DMRS bundling parameter (e.g., a DMRS bundling parameter configured on the UE by the base station).

In general, the UE may selectively perform the time-domain DMRS bundling based at least in part on a type of preemption, a timing of the preemption, a UE capability, a configured DMRS bundling parameter, and/or one or more other factors.

In some aspects, selectively performing the time-domain DMRS bundling includes performing time-domain DMRS bundling for all of the one or more PDSCH communications. For example, when the type of preemption is data-only (e.g., when the preemption indication indicates preemption of data symbols only), the UE may perform time-domain DMRS bundling for all of the one or more PDSCH communications. In some aspects, the UE may perform time-domain DMRS bundling for all of the one or more PDSCH communications even if one or more of the PDSCH communication have been preempted.

In some aspects, selectively performing the time-domain DMRS bundling includes performing time-domain DMRS bundling for at least one subset of PDSCH communications included in the one or more PDSCH communications.

Figure 5B:
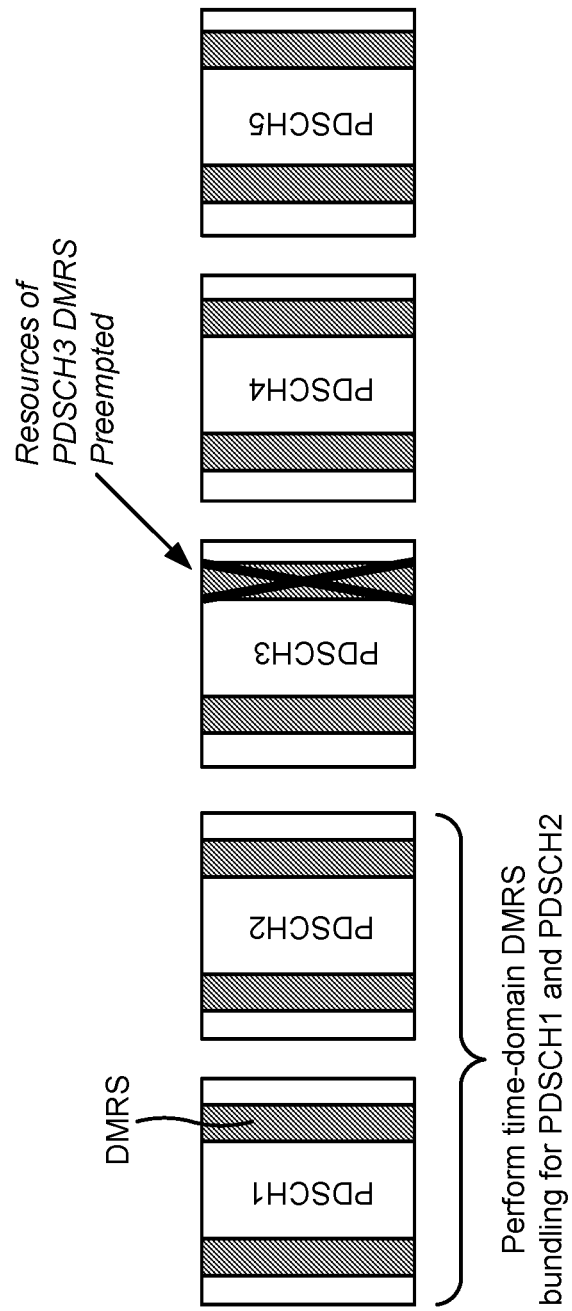
Figure 5C:
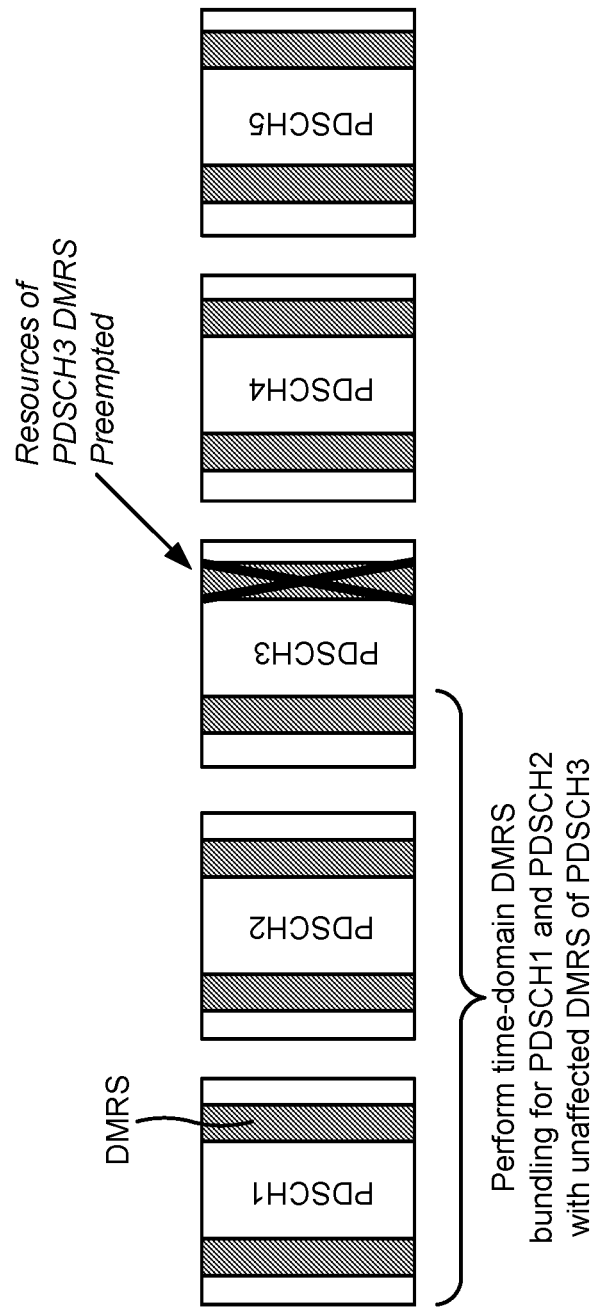

For example, the UE may perform time-domain DMRS bundling for a subset of the one or more PDSCH communications. In this example, the subset of the one or more PDSCH communications may include PDSCH communications before the preempted resources. FIGS. 5B and 5C are diagrams illustrating examples of such time-domain DMRS bundling. In FIGS. 5B and 5C, a preemption indication indicates that DMRS resources of a particular PDSCH communication (PDSCH3) are preempted. In the example shown in FIG. 5B, based at least in part on the preemption indication, the UE performs time-domain DMRS bundling for PDSCH1 and PDSCH2 (e.g., the UE bundles only the first two PDSCH communications). In the example, shown in FIG. 5C, based at least in part on the preemption indication, the UE performs time-domain DMRS bundling for PDSCH1 and PDSCH2 with an unaffected DMRS of PDSCH3 (e.g., the UE bundles only the first two PDSCH communications with the DMRS of the third PDSCH communication that is not affected by the preemption).

Figure 5D:
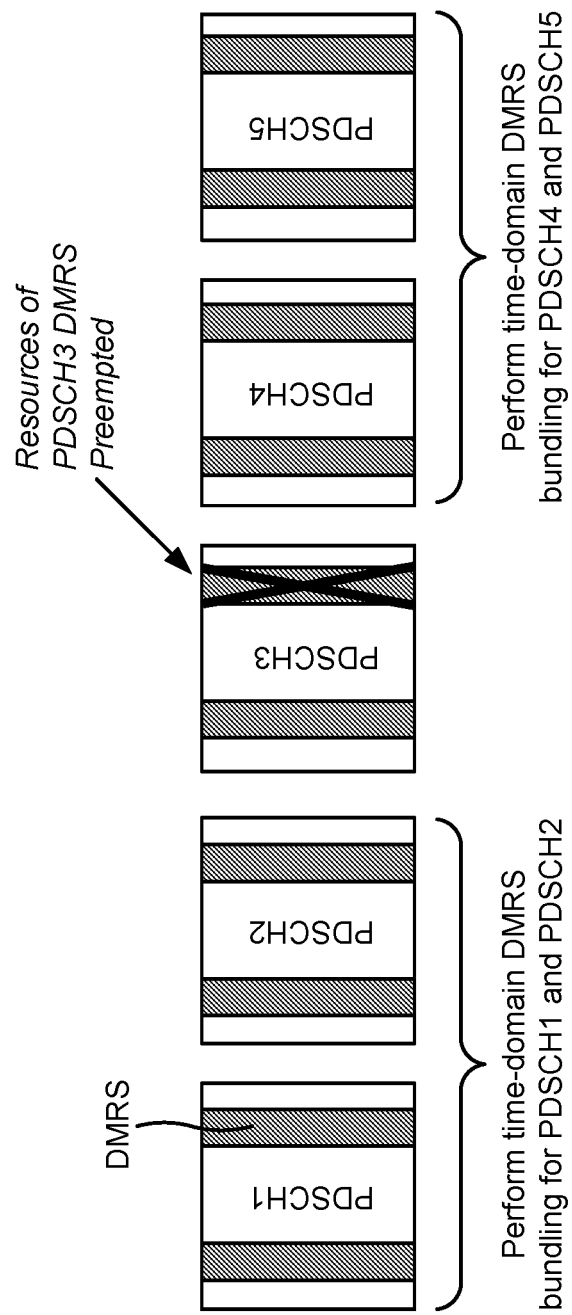
Figure 5E:
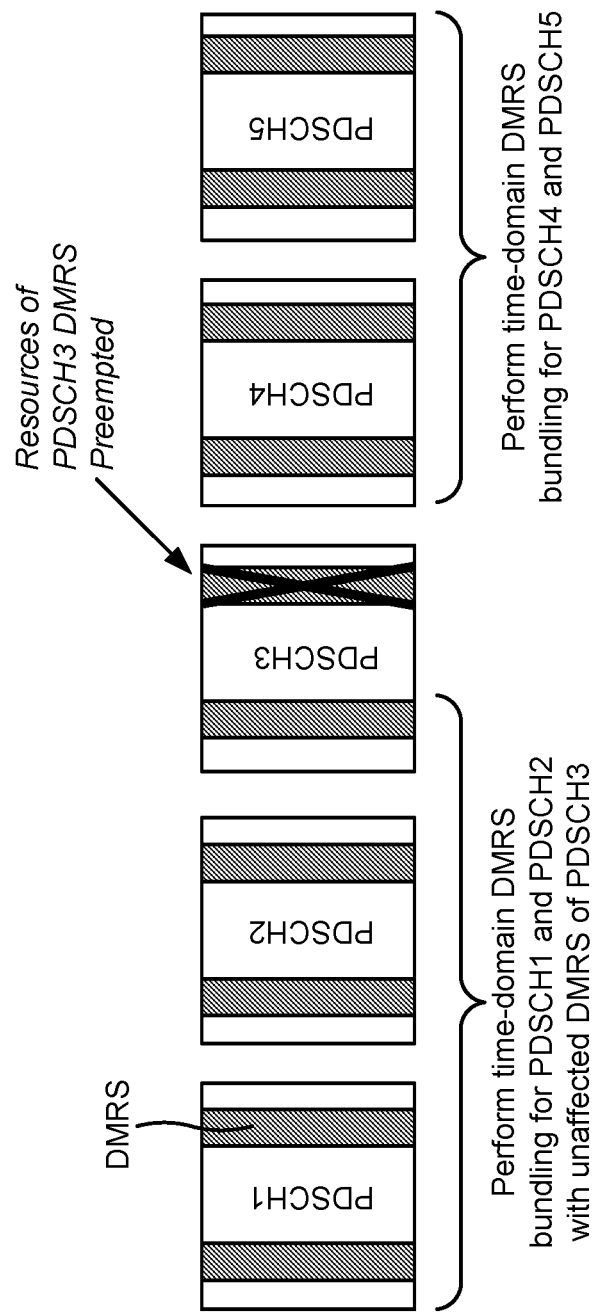
Figure 5F:
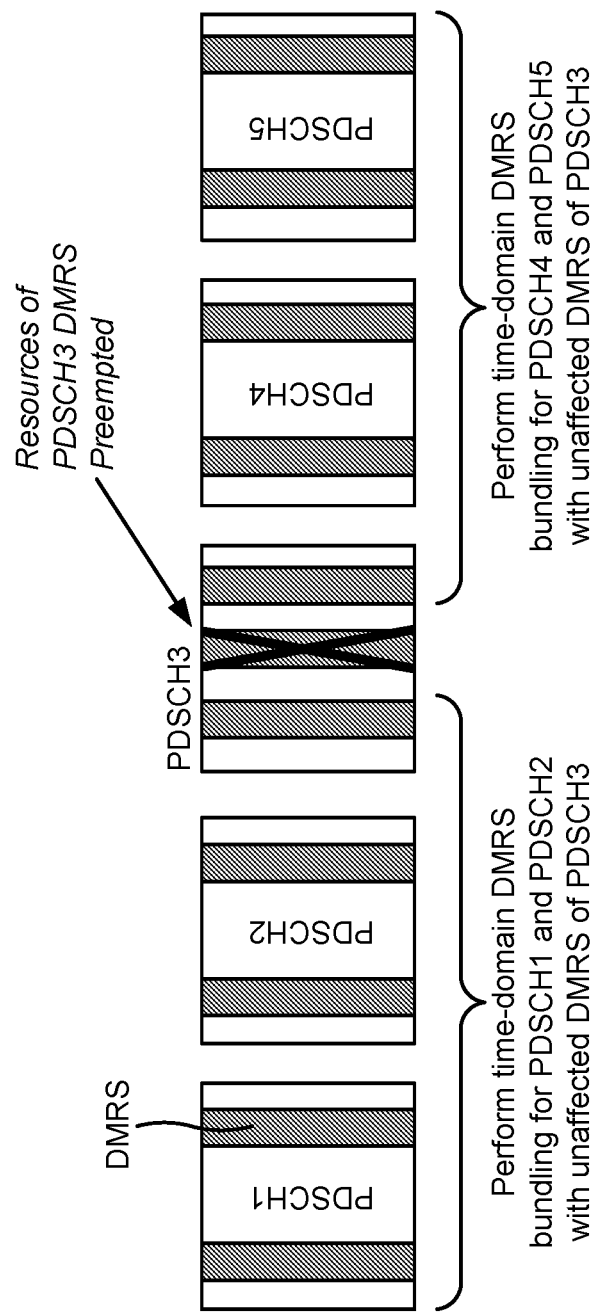

As another example, the UE may perform time-domain DMRS bundling for a first subset of the one or more PDSCH communications and may perform time-domain DMRS bundling for a second subset of the one or more PDSCH communications. In this example, the first subset of the one or more PDSCH communications may include PDSCH communications before the preempted resources and the second subset of the one or more PDSCH communications may include PDSCH communications after the preempted resources. FIGS. 5D-5F are diagrams illustrating examples of such time-domain DMRS bundling. In FIGS. 5D-5F, a preemption indication indicates that DMRS resources of a particular PDSCH communication (PDSCH3) are preempted. In the example shown in FIG. 5D, based at least in part on the preemption indication, the UE performs time-domain DMRS bundling for a subset of PDSCH communications including PDSCH1 and PDSCH2, and performs time-domain DMRS bundling for a subset of PDSCH communications including PDSCH4 and PDSCH5. In the example, shown in FIG. 5E, based at least in part on the preemption indication, the UE performs time-domain DMRS bundling for a subset of PDSCH communications including PDSCH1 and PDSCH2 with an unaffected DMRS of PDSCH3, and performs time-domain DMRS bundling for a subset of PDSCH communications including PDSCH4 and PDSCH5. In the example, shown in FIG. 5F, based at least in part on the preemption indication, the UE performs time-domain DMRS bundling for a subset of PDSCH communications including PDSCH1 and PDSCH2 with a first unaffected DMRS of PDSCH3, and performs time-domain DMRS bundling for a subset of PDSCH communications including PDSCH4 and PDSCH5 with a second unaffected DMRS of PDSCH3.

As another example, the UE may perform time-domain DMRS bundling for a first subset of the one or more PDSCH communications and may perform per-PDSCH DMRS processing, i.e. without time-domain DMRS bundling, for at least one other PDSCH communication of the one or more PDSCH communications. Here, the first subset of the one or more PDSCH communications may include PDSCH communications before the preempted resources, and the at least one other PDSCH communication may include PDSCH communications after the preempted resources.

In some aspects, selectively performing the time-domain DMRS bundling includes refraining from performing time-domain DMRS bundling for any of the one or more PDSCH communications. That is, in some aspects, the UE may not perform time-domain DMRS bundling for any of the one or more PDSCH communication based at least in part on the preemption indication.

As indicated above, FIGS. 5A-5F are provided as examples. Other examples may differ from what is described with respect to FIGS. 5A-5F.

Figure 6:
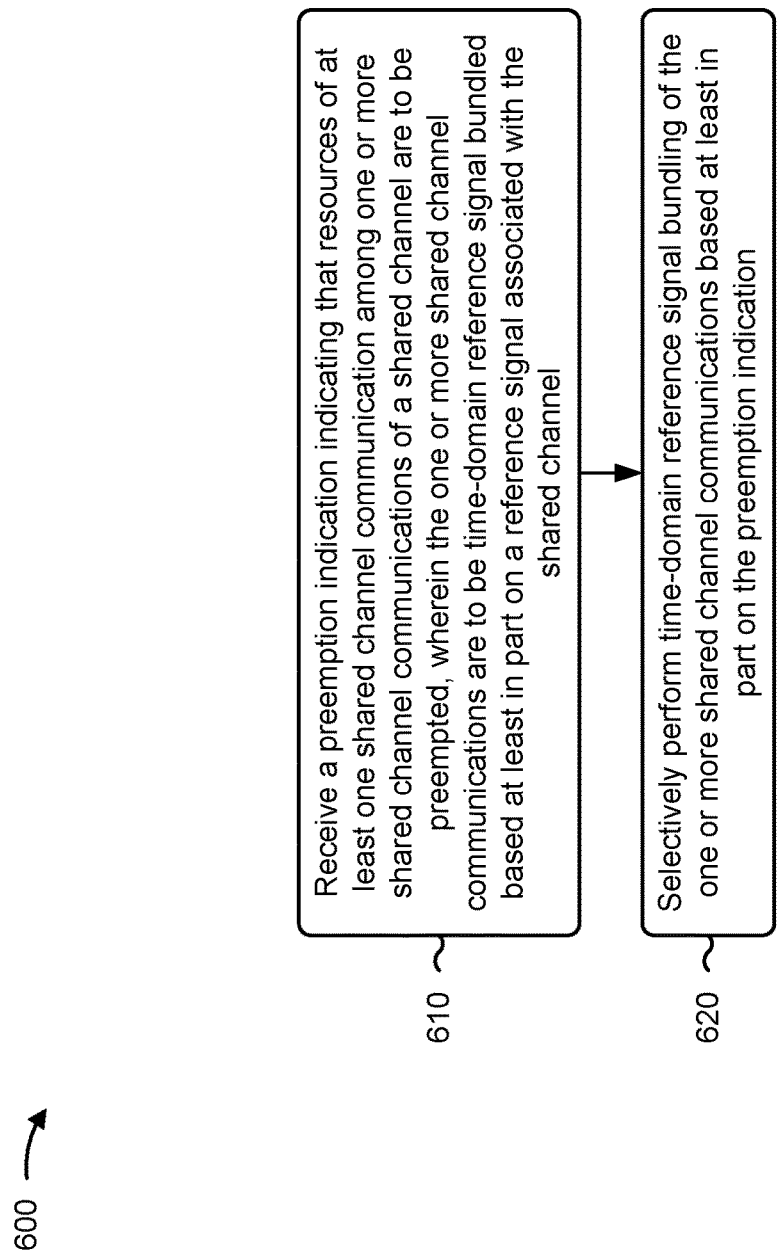
FIG. 6 is a diagram illustrating an example process performed, for example, by a user equipment, in accordance with various aspects of the present disclosure.

FIG. 6 is a diagram illustrating an example process 600 performed, for example, by UE, in accordance with various aspects of the present disclosure. Example process 600 is an example where the UE (e.g., UE 120 and/or the like) performs operations associated with relation of shared channel reference signal bundling to a preemption indication.

As shown in FIG. 6, in some aspects, process 600 may include receiving a preemption indication indicating that resources of at least one shared channel communication among one or more shared channel communications of a shared channel are to be preempted, wherein the one or more shared channel communications are to be time-domain RS bundled based at least in part on an RS associated with the shared channel (block 610). For example, the UE (e.g., antenna 252, DEMOD 254, MIMO detector 256, receive processor 258, controller/processor 280, memory 282, and/or the like) may receive a preemption indication indicating that resources of at least one shared channel communication among one or more shared channel communications of a shared channel are to be preempted, as described above, for example, with reference to FIGS. 5A-5F. In some aspects, the one or more shared channel communications are to be time-domain RS bundled based at least in part on an RS associated with the shared channel.

As further shown in FIG. 6, in some aspects, process 600 may include selectively performing time-domain RS bundling of the one or more shared channel communications based at least in part on the preemption indication (block 620). For example, the UE (e.g., DEMOD 254, MIMO detector 256, receive processor 258, controller/processor 280, memory 282, and/or the like) may selectively perform time-domain RS bundling of the one or more shared channel communications based at least in part on the preemption indication, as described above, for example, with reference to FIGS. 5A-5F. In some aspects, the UE may adjust time-domain RS bundling of the one or more shared channel communications based at least in part on the preemption indication. The adjustment may include omitting one or more of the shared channel communications from the time-domain RS bundling as described above.

Process 600 may include additional aspects, such as any single aspect or any combination of aspects described below and/or in connection with one or more other processes described elsewhere herein.

In a first aspect, selectively performing the time-domain RS bundling based at least in part on the preemption indication comprises selectively performing the time-domain RS bundling based at least in part on a type of preemption associated with the preemption indication.

In a second aspect, alone or in combination with the first aspect, selectively performing the time-domain RS bundling based at least in part on the preemption indication comprises selectively performing the time-domain RS bundling based at least in part on a determination of whether the resources indicated by the preemption indication include one or more RS resources.

In a third aspect, alone or in combination with one or more of the first and second aspects, selectively performing the time-domain RS bundling based at least in part on the preemption indication comprises selectively performing the time-domain RS bundling based at least in part on a determination of whether the preemption indication indicates that a shared channel communication, of the one or more shared channel communications, is to be fully preempted.

In a fourth aspect, alone or in combination with one or more of the first through third aspects, responsive to the preemption indication indicating that the shared channel communication is to be fully preempted, selectively performing the time-domain RS bundling based at least in part on the preemption indication comprises selectively performing the time-domain RS bundling based at least in part on a determination of whether a gap, associated with the shared channel communication that is to be fully preempted, satisfies a threshold.

In a fifth aspect, alone or in combination with one or more of the first through fourth aspects, selectively performing the time-domain RS bundling based at least in part on the preemption indication comprises selectively performing the time-domain RS bundling based at least in part on timing of the preemption indication.

In a sixth aspect, alone or in combination with one or more of the first through fifth aspects, selectively performing the time-domain RS bundling based at least in part on the preemption indication comprises selectively performing the time-domain RS bundling based at least in part on a determination that the preemption indication is a post-indication associated with the preemption.

In a seventh aspect, alone or in combination with one or more of the first through sixth aspects, process 600 includes determining that the preemption indication is a post-indication associated with the preemption based at least in part on a UE capability.

In an eighth aspect, alone or in combination with one or more of the first through seventh aspects, process 600 includes determining that the preemption indication is a post-indication based at least in part on the preemption indication being received after an end of a last shared channel communication of the one or more shared channel communications to be time-domain RS bundled.

In a ninth aspect, alone or in combination with one or more of the first through eighth aspects, process 600 includes determining that the preemption indication is a post-indication based at least in part on the preemption indication being received at least a threshold amount of time after an end of a last shared channel communication of the one or more shared channel communications to be time-domain RS bundled.

In a tenth aspect, alone or in combination with one or more of the first through ninth aspects, the threshold amount of time is based at least in part on a UE capability.

In an eleventh aspect, alone or in combination with one or more of the first through tenth aspects, process 600 includes determining that the preemption indication is a post-indication based at least in part on the preemption indication being received at a time that would cause the UE to change an RS bundling behavior.

In a twelfth aspect, alone or in combination with one or more of the first through eleventh aspects, selectively performing the time-domain RS bundling based at least in part on the preemption indication comprises selectively performing the time-domain RS bundling based at least in part on a determination that the preemption indication is a pre-indication associated with the preemption.

In a thirteenth aspect, alone or in combination with one or more of the first through twelfth aspects, selectively performing the time-domain RS bundling based at least in part on the preemption indication comprises selectively performing the time-domain RS bundling based at least in part on a determination that the preemption indication is a current-indication associated with the preemption.

In a fourteenth aspect, alone or in combination with one or more of the first through thirteenth aspects, selectively performing the time-domain RS bundling based at least in part on the preemption indication comprises selectively performing the time-domain RS bundling based at least in part on a UE capability.

In a fifteenth aspect, alone or in combination with one or more of the first through fourteenth aspects, selectively performing the time-domain RS bundling based at least in part on the preemption indication comprises selectively performing the time-domain RS bundling based at least in part on a configured RS bundling parameter.

In a sixteenth aspect, alone or in combination with one or more of the first through fifteenth aspects, selectively performing the time-domain RS bundling includes performing time-domain RS bundling for all of the one or more shared channel communications.

In a seventeenth aspect, alone or in combination with one or more of the first through sixteenth aspects, selectively performing the time-domain RS bundling includes performing time-domain RS bundling for at least one subset of shared channel communications included in the one or more shared channel communications.

In an eighteenth aspect, alone or in combination with one or more of the first through seventeenth aspects, selectively performing the time-domain RS bundling includes performing time-domain RS bundling for a first subset of shared channel communications, of the one or more shared channel communications, and performing time-domain RS bundling for a second subset of the shared channel communications of the one or more shared channel communications, the first subset of shared channel communications being before the resources of the one or more shared channel communications that are preempted and the second subset of shared channel communications being after the resources of the one or more shared channel communications that are preempted.

In a nineteenth aspect, alone or in combination with one or more of the first through eighteenth aspects, selectively performing the time-domain RS bundling includes performing time-domain RS bundling for a first subset of shared channel communications, of the one or more shared channel communications, and performing per-shared channel RS processing, i.e. without time-domain RS bundling, for at least one other shared channel communication of the one or more shared channel communications, the first subset of shared channel communications being before the resources of the one or more shared channel communications that are preempted and the at least one other shared channel communication being after the resources of the one or more shared channel communications that are preempted.

In a twentieth aspect, alone or in combination with one or more of the first through nineteenth aspects, selectively performing the time-domain RS bundling includes refraining from performing time-domain RS bundling for any of the one or more shared channel communications.

In a twenty-first aspect, alone or in combination with one or more of the first through twentieth aspects, process 600 includes receiving an indication that the one or more shared channel communications are to be time-domain RS bundled via at least one of RRC signaling, a MAC-CE, or DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a user equipment (UE), comprising: receiving a preemption indication indicating that resources of at least one shared channel communication among one or more shared channel communications of shared channel are to be preempted, wherein the one or more shared channel communications are to be time-domain reference signal (RS) bundled based at least in part on an RS associated with the shared channel; and selectively performing time-domain RS bundling of the one or more shared channel communications based at least in part on the preemption indication.

Aspect 2: The method of aspect 1, wherein selectively performing the time-domain RS bundling based at least in part on the preemption indication comprises selectively performing the time-domain RS bundling based at least in part on a type of preemption associated with the preemption indication.

Aspect 3: The method of any of aspects 1-2, wherein selectively performing the time-domain RS bundling based at least in part on the preemption indication comprises selectively performing the time-domain RS bundling based at least in part on a determination of whether the resources indicated by the preemption indication include one or more RS resources.

Aspect 4: The method of any of aspects 1-3, wherein selectively performing the time-domain RS bundling based at least in part on the preemption indication comprises selectively performing the time-domain RS bundling based at least in part on a determination of whether the preemption indication indicates that a shared channel communication, of the one or more shared channel communications, is to be fully preempted.

Aspect 5: The method of aspect 4, wherein, responsive to the preemption indication indicating that the shared channel communication is to be fully preempted, selectively performing the time-domain RS bundling based at least in part on the preemption indication comprises selectively performing the time-domain RS bundling based at least in part on a determination of whether a gap, associated with the shared channel communication that is to be fully preempted, satisfies a threshold.

Aspect 6: The method of any of aspects 1-5, wherein selectively performing the time-domain RS bundling based at least in part on the preemption indication comprises selectively performing the time-domain RS bundling based at least in part on timing of the preemption indication.

Aspect 7: The method of any of aspects 1-6, wherein selectively performing the time-domain RS bundling based at least in part on the preemption indication comprises selectively performing the time-domain RS bundling based at least in part on a determination that the preemption indication is a post-indication associated with the preemption.

Aspect 8: The method of aspect 7, further comprising determining that the preemption indication is a post-indication associated with the preemption based at least in part on a UE capability.

Aspect 9: The method of any of aspects 7-8, further comprising determining that the preemption indication is a post-indication based at least in part on the preemption indication being received after an end of a last shared channel communication of the one or more shared channel communications.

Aspect 10: The method of any of aspects 7-9, further comprising determining that the preemption indication is a post-indication based at least in part on the preemption indication being received at least a threshold amount of time after an end of a last shared channel communication of the one or more shared channel communications.

Aspect 11: The method of aspect 10, wherein the threshold amount of time is based at least in part on a UE capability.

Aspect 12: The method of any of aspects 7-11, further comprising determining that the preemption indication is a post-indication based at least in part on the preemption indication being received at a time that would cause the UE to change a RS bundling behavior.

Aspect 13: The method of any of aspects 1-6, wherein selectively performing the time-domain RS bundling based at least in part on the preemption indication comprises selectively performing the time-domain RS bundling based at least in part on a determination that the preemption indication is a pre-indication associated with the preemption.

Aspect 14: The method of any of aspects 1-6, wherein selectively performing the time-domain RS bundling based at least in part on the preemption indication comprises selectively performing the time-domain RS bundling based at least in part on a determination that the preemption indication is a current-indication associated with the preemption.

Aspect 15: The method of any of aspects 1-14, wherein selectively performing the time-domain RS bundling based at least in part on the preemption indication comprises selectively performing the time-domain RS bundling based at least in part on a UE capability.

Aspect 16: The method of any of aspects 1-15, wherein selectively performing the time-domain RS bundling based at least in part on the preemption indication comprises selectively performing the time-domain RS bundling based at least in part on a configured RS bundling parameter.

Aspect 17: The method of any of aspects 1-16, wherein selectively performing the time-domain RS bundling includes performing time-domain RS bundling for all of the one or more shared channel communications.

Aspect 18: The method of any of aspects 1-16, wherein selectively performing the time-domain RS bundling includes performing time-domain RS bundling for at least one subset of shared channel communications included in the one or more shared channel communications.

Aspect 19: The method of any of aspects 1-16, wherein selectively performing the time-domain RS bundling includes performing time-domain RS bundling for a first subset of shared channel communications, of the one or more shared channel communications, and performing time-domain RS bundling for a second subset of the shared channel communications of the one or more shared channel communications, wherein the first subset of shared channel communications is before the resources of the one or more shared channel communications that are preempted, and wherein the second subset of shared channel communications is after the resources of the one or more shared channel communications that are preempted.

Aspect 20: The method of any of aspects 1-16, wherein selectively performing the time-domain RS bundling includes performing time-domain RS bundling for a first subset of shared channel communications, of the one or more shared channel communications, and performing per-shared channel RS processing for at least one other shared channel communication of the one or more shared channel communications, wherein the first subset of shared channel communications is before the resources of the one or more shared channel communications that are preempted, and wherein the at least one other shared channel communication is after the resources of the one or more shared channel communications that are preempted.

Aspect 21: The method of any of aspects 1-16, wherein selectively performing the time-domain RS bundling includes refraining from performing time-domain RS bundling for any of the one or more shared channel communications.

Aspect 22: The method of any of aspects 1-21, further comprising receiving an indication that the one or more shared channel communications are to be time-domain RS bundled via at least one of: radio resource control signaling; a medium access control control element; or downlink control information.

Aspect 23: The method of any of aspects 1-22, wherein the shared channel is a physical downlink shared channel (PDSCH) and the one or more shared channel communications include one or more PDSCH communications.

Aspect 24: The method of any of aspects 1-23, wherein the RS is a demodulation RS (DMRS) and the time-domain RS bundling is time-domain DMRS bundling.

Aspect 25: An apparatus for wireless communication at a device, comprising a processor; memory coupled with the processor; and instructions stored in the memory and executable by the processor to cause the apparatus to perform the method of one or more aspects of aspects 1-24.

Aspect 26: A device for wireless communication, comprising a memory and one or more processors coupled to the memory, the memory and the one or more processors configured to perform the method of one or more aspects of aspects 1-24.

Aspect 27: An apparatus for wireless communication, comprising at least one means for performing the method of one or more aspects of aspects 1-24.

Aspect 28: A non-transitory computer-readable medium storing code for wireless communication, the code comprising instructions executable by a processor to perform the method of one or more aspects of aspects 1-24.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-24.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a preemption indication indicating that resources of at least one shared channel communication among one or more shared channel communications of a shared channel are to be preempted,
   wherein the one or more shared channel communications are to be time-domain reference signal (RS) bundled based at least in part on an RS associated with the shared channel; and
   selectively performing time-domain RS bundling of the one or more shared channel communications based at least in part on the preemption indication.

2. The method of claim 1, wherein selectively performing the time-domain RS bundling based at least in part on the preemption indication comprises selectively performing the time-domain RS bundling based at least in part on a type of preemption associated with the preemption indication.

3. The method of claim 1, wherein selectively performing the time-domain RS bundling based at least in part on the preemption indication comprises selectively performing the time-domain RS bundling based at least in part on a determination of whether the resources indicated by the preemption indication include one or more RS resources.

4. The method of claim 1, wherein selectively performing the time-domain RS bundling based at least in part on the preemption indication comprises selectively performing the time-domain RS bundling based at least in part on a determination of whether the preemption indication indicates that a shared channel communication, of the one or more shared channel communications, is to be fully preempted.

5. The method of claim 4, wherein, responsive to the preemption indication indicating that the shared channel communication is to be fully preempted, selectively performing the time-domain RS bundling based at least in part on the preemption indication comprises selectively performing the time-domain RS bundling based at least in part on a determination of whether a gap, associated with the shared channel communication that is to be fully preempted, satisfies a threshold.

6. The method of claim 1, wherein selectively performing the time-domain RS bundling based at least in part on the preemption indication comprises selectively performing the time-domain RS bundling based at least in part on timing of the preemption indication.

7. The method of claim 1, wherein selectively performing the time-domain RS bundling based at least in part on the preemption indication comprises selectively performing the time-domain RS bundling based at least in part on a determination that the preemption indication is a post-indication associated with the preemption.

8. The method of claim 7, further comprising determining that the preemption indication is a post-indication associated with the preemption based at least in part on a UE capability.

9. The method of claim 7, further comprising determining that the preemption indication is a post-indication based at least in part on the preemption indication being received after an end of a last shared channel communication of the one or more shared channel communications.

10. The method of claim 7, further comprising determining that the preemption indication is a post-indication based at least in part on the preemption indication being received at least a threshold amount of time after an end of a last shared channel communication of the one or more shared channel communications.

11. The method of claim 10, wherein the threshold amount of time is based at least in part on a UE capability.

12. The method of claim 7, further comprising determining that the preemption indication is a post-indication based at least in part on the preemption indication being received at a time that would cause the UE to change a RS bundling behavior.

13. The method of claim 1, wherein selectively performing the time-domain RS bundling based at least in part on the preemption indication comprises selectively performing the time-domain RS bundling based at least in part on a determination that the preemption indication is a pre-indication associated with the preemption.

14. The method of claim 1, wherein selectively performing the time-domain RS bundling based at least in part on the preemption indication comprises selectively performing the time-domain RS bundling based at least in part on a determination that the preemption indication is a current-indication associated with the preemption.

15. The method of claim 1, wherein selectively performing the time-domain RS bundling based at least in part on the preemption indication comprises selectively performing the time-domain RS bundling based at least in part on a UE capability.

16. The method of claim 1, wherein selectively performing the time-domain RS bundling based at least in part on the preemption indication comprises selectively performing the time-domain RS bundling based at least in part on a configured RS bundling parameter.

17. The method of claim 1, wherein selectively performing the time-domain RS bundling includes performing time-domain RS bundling for all of the one or more shared channel communications.

18. The method of claim 1, wherein selectively performing the time-domain RS bundling includes performing time-domain RS bundling for at least one subset of shared channel communications included in the one or more shared channel communications.

19. The method of claim 1, wherein selectively performing the time-domain RS bundling includes performing time-domain RS bundling for a first subset of shared channel communications, of the one or more shared channel communications, and performing time-domain RS bundling for a second subset of the shared channel communications of the one or more shared channel communications,
   wherein the first subset of shared channel communications is before the resources of the at least one shared channel communication that are preempted, and
   wherein the second subset of shared channel communications is after the resources of the at least one shared channel communication that are preempted.

20. The method of claim 1, wherein selectively performing the time-domain RS bundling includes performing time-domain RS bundling for a first subset of shared channel communications, of the one or more shared channel communications, and performing per-shared channel RS processing for at least one other shared channel communication of the one or more shared channel communications,
   wherein the first subset of shared channel communications is before the resources of the at least one shared channel communication that are preempted, and wherein the at least one other shared channel communication is after the resources of the at least one shared channel communication that are preempted.

21. The method of claim 1, wherein selectively performing the time-domain RS bundling includes refraining from performing time-domain RS bundling for any of the one or more shared channel communications.

22. The method of claim 1, further comprising receiving an indication that the one or more shared channel communications are to be time-domain RS bundled via at least one of:
   radio resource control signaling;
   a medium access control control element; or
   downlink control information.

23. The method of claim 1, wherein the shared channel is a physical downlink shared channel (PDSCH) and the one or more shared channel communications include one or more PDSCH communications.

24. The method of claim 1, wherein the RS is a demodulation RS (DMRS) and the time-domain RS bundling is time-domain DMRS bundling.

25. A user equipment (UE) for wireless communication, comprising:
   a memory; and
   one or more processors operatively coupled to the memory, the memory and the one or more processors configured to:
   receive a preemption indication indicating that resources of at least one shared channel communication among one or more shared channel communications of a shared channel are to be preempted,
   wherein the one or more shared channel communications are to be time-domain reference signal (RS) bundled based at least in part on an RS associated with the shared channel; and
   selectively perform time-domain RS bundling of the one or more shared channel communications based at least in part on the preemption indication.

26. The UE of claim 25, wherein the one or more processors, when selectively performing the time-domain RS bundling based at least in part on the preemption indication, are configured to selectively perform the time-domain RS bundling based at least in part on a type of preemption associated with the preemption indication.

27. The UE of claim 25, wherein the one or more processors, when selectively performing the time-domain RS bundling based at least in part on the preemption indication, are configured to selectively perform the time-domain RS bundling based at least in part on a determination of whether the resources indicated by the preemption indication include one or more RS resources.

28. The UE of claim 25, wherein the one or more processors, when selectively performing the time-domain RS bundling based at least in part on the preemption indication, are configured to selectively perform the time-domain RS bundling based at least in part on a determination of whether the preemption indication indicates that a shared channel communication, of the one or more shared channel communications, is to be fully preempted.

29. A non-transitory computer-readable medium storing one or more instructions for wireless communication, the one or more instructions comprising:
   one or more instructions that, when executed by one or more processors of a user equipment (UE), cause the one or more processors to:
   receive a preemption indication indicating that resources of at least one shared channel communication among one or more shared channel communications of a shared channel are to be preempted,
   wherein the one or more shared channel communications are to be time-domain reference signal (RS) bundled based at least in part on an RS associated with the shared channel; and
   selectively perform time-domain RS bundling of the one or more shared channel communications based at least in part on the preemption indication.

30. An apparatus for wireless communication, comprising:
   means for receiving a preemption indication indicating that resources of at least one shared channel communication among one or more shared channel communications of a shared channel are to be preempted,
   wherein the one or more shared channel communications are to be time-domain reference signal (RS) bundled based at least in part on an RS associated with the shared channel; and
   means for selectively performing time-domain RS bundling of the one or more shared channel communications based at least in part on the preemption indication.

* * * * *